United States Patent
Morishita

(10) Patent No.: US 6,377,478 B1
(45) Date of Patent: Apr. 23, 2002

(54) INVERTER DEVICE

(75) Inventor: Takashi Morishita, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 09/322,180

(22) Filed: May 28, 1999

(51) Int. Cl.[7] .......................... H02M 3/00; H02M 5/45; H02M 7/00

(52) U.S. Cl. .............................. 363/34; 363/37; 363/71
(58) Field of Search ............................. 363/34, 37, 56, 363/40, 41; 323/222, 271; 318/801, 701; 307/265

(56) References Cited

U.S. PATENT DOCUMENTS

| | | |
|---|---|---|
| 3,638,094 A | 1/1972 | VeNard |
| 4,204,264 A | 5/1980 | Lipman .................. 363/71 |
| 4,212,055 A | 7/1980 | Podlewski ............... 363/71 |
| 4,438,474 A | 3/1984 | Paice |
| 4,441,584 A * | 4/1984 | Mitsui et al. ............ 187/296 |
| 4,441,884 A * | 4/1984 | Mitsui et al. ............ 187/296 |
| 4,674,024 A | 6/1987 | Paice et al. |
| 4,695,933 A | 9/1987 | Nguyen et al. |
| 4,788,635 A * | 11/1988 | Heinrich .................. 363/35 |
| 4,879,639 A * | 11/1989 | Tsukahara ............... 363/37 |
| 4,975,822 A | 12/1990 | Lipman |
| 5,008,797 A | 4/1991 | Patel et al. |
| 5,099,409 A | 3/1992 | Bando et al. |
| 5,214,366 A | 5/1993 | Hollmann |
| 5,515,264 A | 5/1996 | Stacey |
| 5,625,539 A | 4/1997 | Nakata et al. |
| 5,625,545 A * | 4/1997 | Hammond ................ 363/71 |
| 5,638,263 A | 6/1997 | Opal et al. ............... 363/65 |
| 5,852,554 A | 12/1998 | Yamamoto ............... 363/71 |
| 5,999,428 A | 12/1999 | Dahler et al. ............ 363/71 |
| 6,014,323 A | 1/2000 | Aiello et al. ............. 363/71 |

FOREIGN PATENT DOCUMENTS

| | | | |
|---|---|---|---|
| CA | 2 066 490 | 4/1991 | |
| JP | 55-92574 | 7/1980 | .................. 363/71 |

OTHER PUBLICATIONS

O.K. Marti, "Wave Shape of 30– and 60–Phase Rectifier Groups", Electrical Engineering, vol. 59, pp. 218–226, Apr., 1940.
B.R. Pelly, Thyristor Phase–Controlled Converters and Cycloconverters, Exhibits 1 and 2.
Ohno et al., High–Voltage Multiple Phase Thyristor Chopper for Traction Motor Control, IEEE Transactions on Magnetics, vol., Mag–3, No. 3, pp. 232–236, Sep., 1967.
IEEE Recommended Practices and Requirements for Harmonic Control in Electrical Power Systems, No Date IEEE Std. 519–1992.
Halmar Robicon Group Brochure, Dec., 1993.
IEEE Guide for Harmonic Control and Reactive Compensation of Static Power Converters, pp. 21–22, No Date Std. 519–1981.
Tadakuma et al., "Consideration on Large Capacity PWM Inverter For LSM Drives", 1990. No Date.

(List continued on next page.)

Primary Examiner—Rajnikant B. Patel
(74) Attorney, Agent, or Firm—Banner & Witcoff, Ltd.

(57) ABSTRACT

A method and apparatus for conducting regenerative braking for a motor load is disclosed wherein the load is driven by a plurality of power cells on each phase-line to the load, the plurality of power inverters comprising at least one single phase power inverter and at least one 3-phase inverter wherein the 3-phase inverter is connected across 3-phase lines. First, it is detected when the motor load is regenerating a motor load voltage. Then, each single phase inverter in each phase line is shorted out after detecting the motor load regeneration. The motor load voltage is then supplied to the 3-phase inverter. Finally, the load motor voltage is lowered by conducting regenerative braking through the 3-phase inverter.

12 Claims, 13 Drawing Sheets

OTHER PUBLICATIONS

Ito et al., "A Series of PWM Methods of a Multiple Inverter For Adjustable Frequency Drive", pp. 190–195, No Date 1993.

PESC '88 Record, 19th Annual IEEE Power Electronics Specialists Conference, vol. 1, 1988. No Date.

Marchesoni et al., "A Nonconventional Power Converter For Plasma Stabilization", PESC '88 Record, pp. 122–129, Apr., 1988.

Marchesoni et al., "Power Conditioning System Using Sliding Mode Control", PESC '88 Record, pp. 626–633, Apr., 1988.

Third International Conference on Power Electronics and Variable–Speed Drives.

Marchesoni, "High–Performance Current Control Techniques for Applications to Multilevel High Power Voltage Source Inverters", PESC Conf. Milwaukee, Wisconsin, Jun. 26–29, 1989.

Marchesoni et al., "Variable Structure Control System Applied to Multilevel Power Conditioning Converters", Proceedings of the European Space Power Conference, Madrid Oct. 2–6, 1989.

Marchesoni et al., "High Power Factor Control System In Multilevel Converters For AC Heavy Traction Drives", Proceedings of the Fifth Annual IEEE Applied Power Electronics Conference and Exposition, Los Angeles, CA Mar. 11–16, 1990.

Marchesoni et al., "A Non Conventional Power Converter for Plasma Stabilization", IEEE Transactions on Power Electronics, vol. 5, No. 2, Apr., 1990.

Marchesoni et al., "A New Multilevel PWM Method: A Theoretical Analysis", PESC '90, San Antonio, Jun. 10–15, 1990.

Marchesoni et al., "A Modular Approach to Converter Design for High Power AC Drives", EPE '91, 4th European Conference on Power Electronics and Applications, Firenze, Sep. 3–6, 1991.

Marchesoni et al., "A New Multilevel PWM Method: A Theoretical Analysis", PESC '90, San Antonio, Jun. 10–15, 1990.

Marchesoni et al., "A New Multilevel PWM Method: A Theoretical Analysis", IEEE Transactions on Power Electronics, vol. 7, No. 3, Jul. 1992.

Marchesoni et al., "Variable Structure Control System Applied to Multilevel Power Conditioning Converters", Proceedings of the European Space Power Conference, Madrid, Oct. 2–6, 1989.

Marchesoni et al., "A Non Conventional Power Converter for Plasma Stabilization" PESC '88, Doshisha University, Japan, Apr. 11–14. 1988.

Marchesoni et al., "A Non Conventional Power Converter for Plasma Stabilization" IEEE Transactions on Power Electronics, vol. 5, No. 2, Apr. 1990.

Matsui, "A Pulsewidth Modulated Inverter with Parallel–Connected Transistors by Using Current Sharing Reactors", IEEE, Chubu University, Japan, pp. 1015–1019 No Date.

Tadakuma et al., "Consideration on Large Capacity PWM Inverter for LSM Drives", 1990. No Date.

Zhang et al., Force–Commutated HVDC and SVC Based on Phase–Shifted Multi–Converter Modules, IEEE Transactions on Power Delivery, vol. 8, No. 2, Apr. 1993.

Marchesoni et al., "Exploitation of Low–Cost Microcontroller Potentialities to Develop Fully Digital Rotor Flux Oriented Induction Motor Drives", Proceedings of the 1995 IEEE IECON, 21st International Conference on Industrial Electronics, Control, and Instrumentation, vol. 1., 1995. No Date.

Marchesoni et al., "High Computational Power and Great Interfacing Capability For Electric Drives Control: A New Surface–Mount DSP Based System", 8th Mediterranean Electrotechnical Conference, Italy, May 13–16, 1996.

Marchesoni et al., "Implementation of a Sensorless Stator Flux Oriented Asynchronous Motor Drive with High Performances at Low–Speed Operation", 27th Annual IEEE Power Electronics Specialists Conference, Italy, Jun. 23–27, 1996.

Marchesoni et al., "An Induction Motor Drive with Stator Flux Oriented Control Low–cost Implementation", IEEE, pp. 168–173, 1996. No Date.

Marchesoni et al., Experimental Study of a Power Conditioning System Using Sliding Mode Control, IEEE Transactions on Power Electronics, vol. 11, No. 5, 1996. No Date.

Marchesoni et al., "Optimization of Harmonic Performances in Multilevel Converter Structures", Proceedings of the IEEE International Symposium on Industrial Electronics, Portugal, Jul. 7–11, 1997.

Marchesoni et al., "A Simple Approach to Flux and Speed Observation in Induction Motor Drives", IEEE Transactions on Industrial Electronics, vol. 44, No. 4, Aug., 1997.

Marchesoni et al., "A New Approach In Multilevel Power Conversion", 7th European Conference on Power Electronics and Applications, Norway, Sep. 8–10, 1997.

Marchesoni et al., "A Microcontroller–Based Sensorless Stator Flux–Oriented Asynchronous Motor Drive for Traction Applications", IEEE Transactions on Power Electronics, vol. 13, No. 4, Jul., 1998.

Marchesoni, High Performance Current Control Techniques For Applications to Multilevel High–Power Voltage Source Inverters, IEEE Transactions on Power Electronics, vol. 7, No. 1, Jan., 1992.

Marchesoni, "Modulation Techniques for Converters in a Multi–Level Configuration", Fourth Interactive Seminar on Electrical Microprocessor Controls, Bressanone, Mar. 8–9, 1993 (Italian language original and English Translation).

Marchesoni et al., "Multilevel Converters for High Power AC Drives: A Review", IEEE International Symposium on Industrial Electronics, Budapest, Jun. 1–3, 1993.

Marchesoni et al., "AC/DC/AC High Voltage Traction Drives with Quasi–Zero Reactive Power Demand", IEEE Transactions on Power Electronics, vol. 8, No. 4, Oct., 1993.

Marchesoni et al., Development and Use of a New Object Oriented Simulator for Analysing Industrial Plant Power and Control System, $7^{th}$Mediterranean Electrotechnical Conference, Turkey, Apr. 12–14, 1994.

Marchesoni et al., A Low Cost Microcontroller Based System for High Performance AC Motor Drives Development, $20^{th}$International Conference on Industrial Electronics Control and Instrumentation, Italy, Sep. 5–9, 1994.

Marchesoni et al., "Sliding Mode Multilevel Control fro Improved Performances in Power Conditioning System", IEEE Transactions on Power Electronics, vol. 10, No. 4, Jul., 1995.

Marchesoni et al., "Analysis and modeling of the Auxiliary Quasi–Resonant DC Link Inverter applied to ac electric vehicle drives", ISIE '95 Proceedings of the IEEE International Symposium on Industrial Electronics, Greece, Jul. 10–14, 1995.

* cited by examiner

INVERTER DEVICE

FIELD OF THE INVENTION

The present invention relates to an inverter device, and more particularly to a method and apparatus for conducting regenerative braking for a motor load.

BACKGROUND OF THE INVENTION

Pulse width modulation (PWM control system voltage type multi-inverter devices, such as that illustrated in FIG. 13 are well known as control devices for AC motors, such as variable speed control induction motors.

The device illustrated in FIG. 13 is an inverter, configured in a 3-phase star connection, which has 2 single-phase inverters 12 connected in series in one phase. The inverter drives a motor 13 from output terminals U, V, W. In this example, the inverter is configured with a transformer 11, which supplies a 3-phase power source that is insulated at each AC input of the single-phase inverters. The single-phase inverter 12 will be explained in detail with reference to FIG. 14. In FIG. 14, 3-phase AC current is converted to DC current by a 3-phase bridge rectifier 14, and is then smoothed by a smoothing condenser 15. The resulting DC current is then converted by a single-phase bridger inverter 16. This conversion is conducted by using PWM control to convert to an AC current with the desired voltage and frequency.

According to the configuration illustrated in FIG. 13, an output voltage three times greater than the voltage that a single-phase inverter outputs can be obtained, and a large capacity inverter can be configured. Shifting the PWM control timing of the two single-phase inverters, which configure one phase, doubles the PWM frequency that appears in the output, and an output close to a sine wave is obtained by the individual voltage steps becoming ½ when seen in terms of the phases overall.

In the aforementioned multi-form inverter, the PWM signal is generally conducted by shifting the carrier signal phase, as cited in pages 125 and 126 of "Semiconductor Power Conversion Circuits" (Institute of Electrical Engineers of Japan publication, marketed by Ohm Co.), and as cited in U.S. Pat. No. 4,674,024 to Paice and U.S. Pat. No. 5,625,545 to Hammond.

An example of the output voltage waveform is indicated in FIG. 15. By switching alternately between the output voltages U1 and U2 of two single-phase inverters, a waveform generally closer to a sine wave can be obtained. Furthermore, shifting the phase of the secondary windings of the transformer 11 can reduce the high frequency at the input. In other words, the output is made smooth because 3-phase is output by all stages, and it becomes the so-called "12 pulse configuration" in which the phase of the transformer winding is shifted 30°, and the high frequency at the input can be reduced. FIG. 13 illustrates an example of two stages, but it is clear that 3 or more stages will result in obtaining even greater improvements.

Nonetheless, there are problems with these known systems. First, compared to a 3-phase inverter, the single-phase inverters have numerous circuit parts. Secondly, there is an output pulse double the frequency of the output at the DC part, and the use efficiency of the rectifier is poorer than the use efficiency of a 3-phase inverter because of the voltage pulse peak. In addition, the current ripple of the smoothing condenser is large. Furthermore, because the current ripple of this smoothing condenser has a big effect on the life expectancy of the condenser, it is necessary to guarantee sufficient design margins, and this becomes very expensive.

In addition, in order to process the load regeneration power, it is necessary either to consume DC power by resistance at all of the single-phase inverters, or to provide a special conversion circuit at the power source which becomes a problem as the size of the condenser increases. Further, there is also the problem that the fewer the single-phase inverter stages, the more the current input high frequency increases.

Consequently, in consideration of the aforementioned problems, the present invention has the purpose of offering an inverter device that can increase the inverter capacity and heighten the voltage by grouping a 3-phase inverter with single-phase inverters, and that, by reducing the number of parts, can improve reliability and economy, reduce the input high frequency, and realize at low cost a regeneration function.

SUMMARY OF THE INVENTION

According to one embodiment of the invention, a method for conducting regenerative braking for a motor load is disclosed wherein the load is driven by a plurality of power cells on each phase-line to the load, the plurality of power inverters comprising at least one single phase power inverter and at least one 3-phase inverter wherein the 3-phase inverter is connected across 3-phase lines. First, it is detected when the motor load is regenerating a motor load voltage. Then, each single phase inverter in each phase line is shorted out after detecting the motor load regeneration. The motor load voltage is then supplied to the 3-phase inverter Finally, the load motor voltage is lowered by conducting regenerative braking through the 3-phase inverter.

According to another embodiment of the invention, a power drive system is disclosed for driving a motor load which provides regenerative braking for the motor load. The system comprises a plurality of power inverters on each pulse line of the motor load, the plurality including at least one single phase inverter and at least one 3-phase inverter wherein the 3-phase inverter is connected across the different phase lines to the motor load. The system comprises mean for detecting when the motor load is regenerating a motor load voltage. In addition, the system comprises means for shorting out each single phase inverter in each phase line after detecting the motor load regeneration. The system comprises means for supplying said load voltage to a 3-phase inverter, and means for lowering said motor load voltage by conducting regenerative braking through the 3-phase inverters.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION

Figure 13:
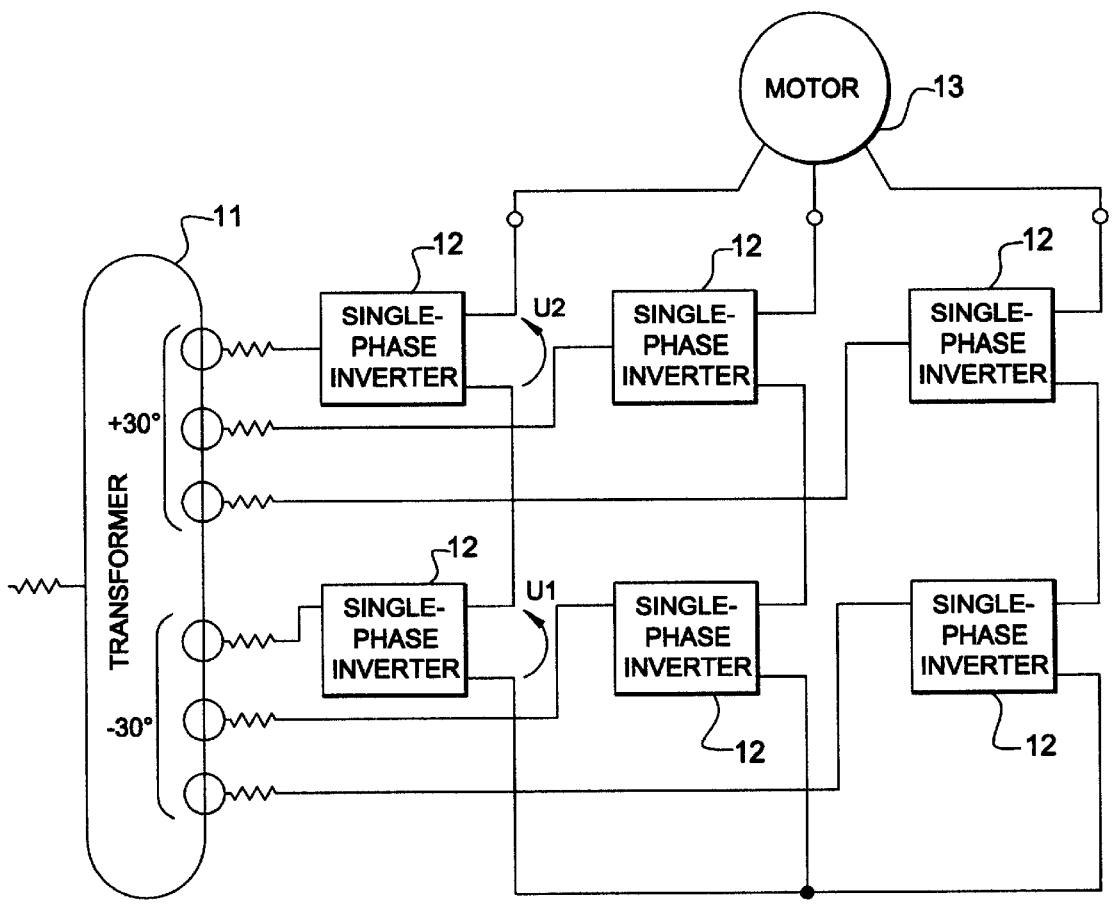
FIG. 13 is a general schematic diagram illustrating a voltage-type multi-inverter device of a conventional PWM system.

A first embodiment will be explained with reference to FIGS. 1 and 2. The configuration elements illustrated in FIG. 1 that are the same as the configuration elements in FIG. 13 will be given the same numbers, and they will not be explained. One point that differs from FIG. 13 is that the three lower stage single-phase inverters have been replaced with one 3-phase inverter 17.

Figure 2:
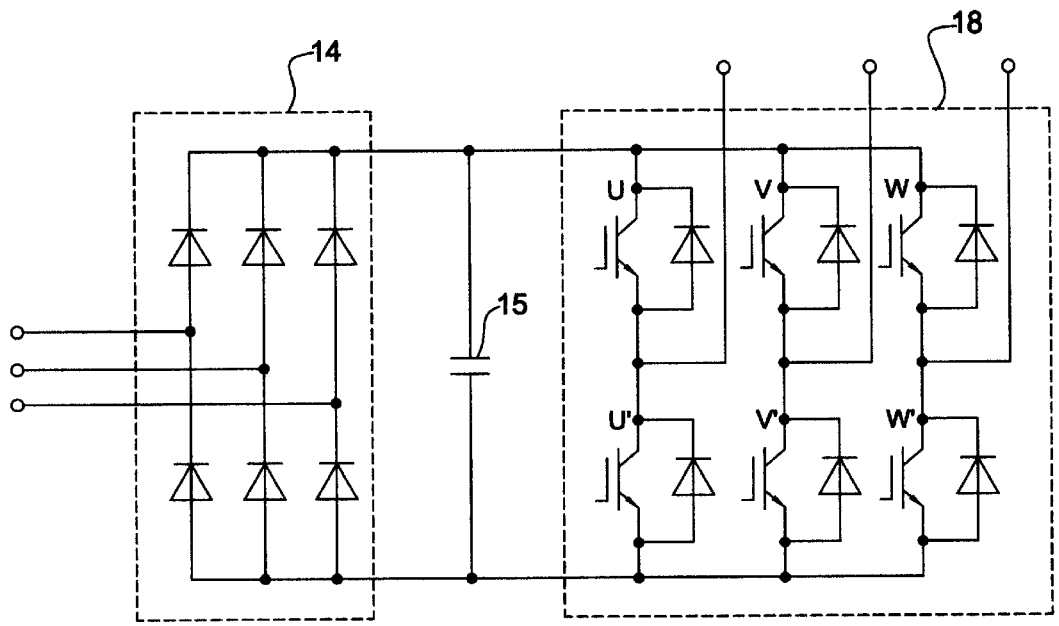
FIG. 2 is a detail schematic diagram illustrating the 3-phase inverter shown in FIG. 1.

The details of 3-phase inverter 17 are indicated in FIG. 2. The 3-phase bridge (rectifying circuit) 14 and the smoothing condenser 15 in FIG. 2 are the same as those indicated in FIG. 13, and a difference between FIG. 2 and FIG. 13 is a 3-phase bridge inverter 18.

Consequently, in this embodiment, not only can the input high frequency be reduced and the output waveform approach a sine wave, but also the device can be completed with fewer parts, because the single 3-phase inverter has a simpler configuration than does the three single-phase inverters. In addition, the power pulse in single-phase inverters is twice that of the output frequency, which has an effect on the smoothing condenser and the rectifier. However, since the total value of the 3-phase output current is normally 0 at any given time in a 3-phase inverter, the aforementioned power pulse is not a concern. For this reason, the reliability can be improved and the number of parts reduced by combining single-phase inverters with a 3-phase inverter.

Figure 3:
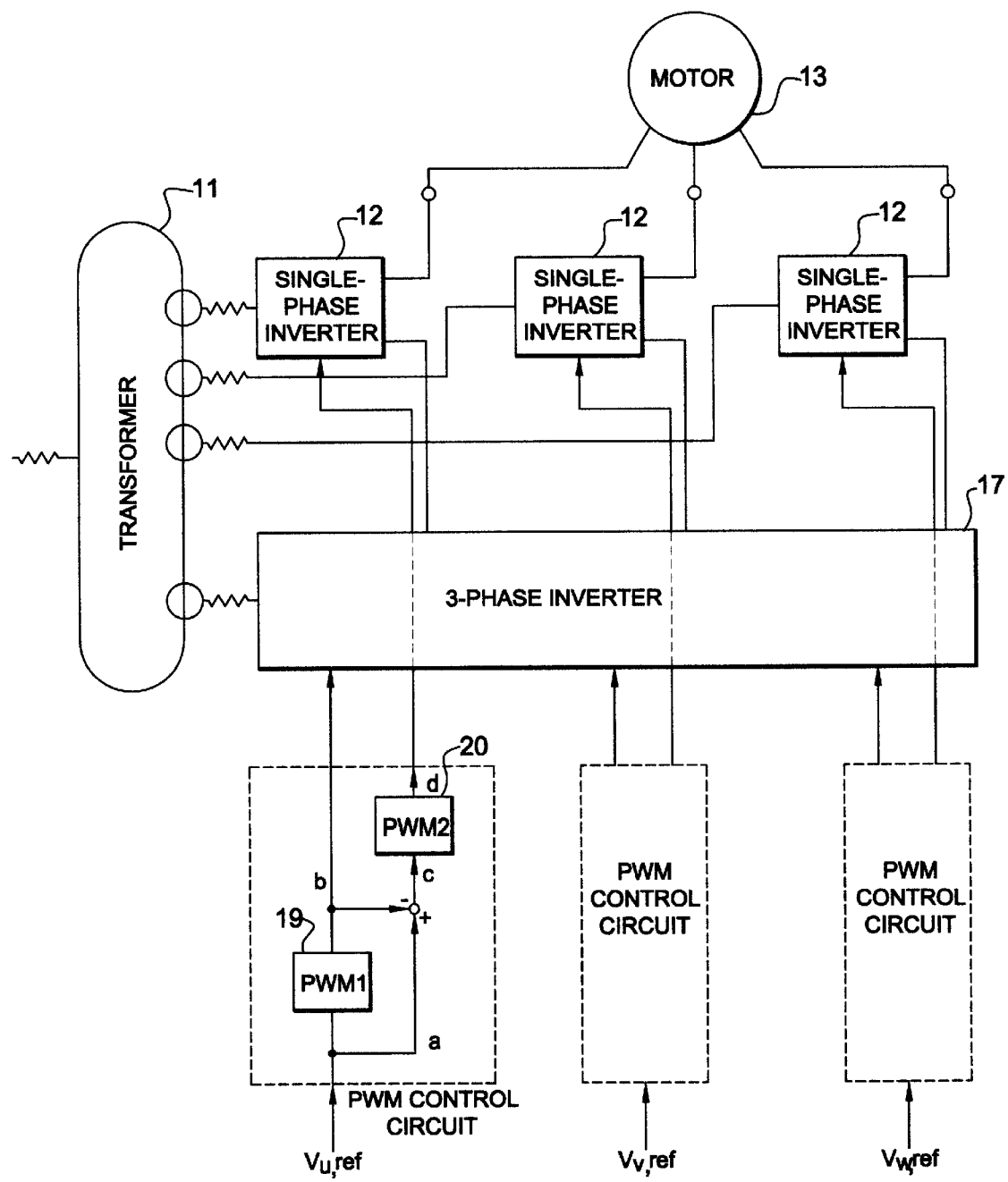
FIG. 3 is a general schematic diagram illustrating one embodiment of the present invention.

Another embodiment will be explained with reference to FIGS. 3 and 4. The configuration elements illustrated in FIG. 3 that are the same as the configuration elements in FIG. 1, will be given the same numbers, and they will not be explained. One difference from FIG. 1 is that the signals that control the single-phase inverters 12 are controlled such that the difference between the 3-phase inverter output signals and the standard sine wave is supplemented.

Then, in this embodiment, the sine wave standard, signal a, is input into a PWM control circuit 19, signal b, which controls the 3-phase inverter 18 is generated. Signal c, which is the difference between signal a and signal b, is input into the PWM control circuit 20, and signal d, which controls the single phase inverter 12, is obtained.

Figure 4:
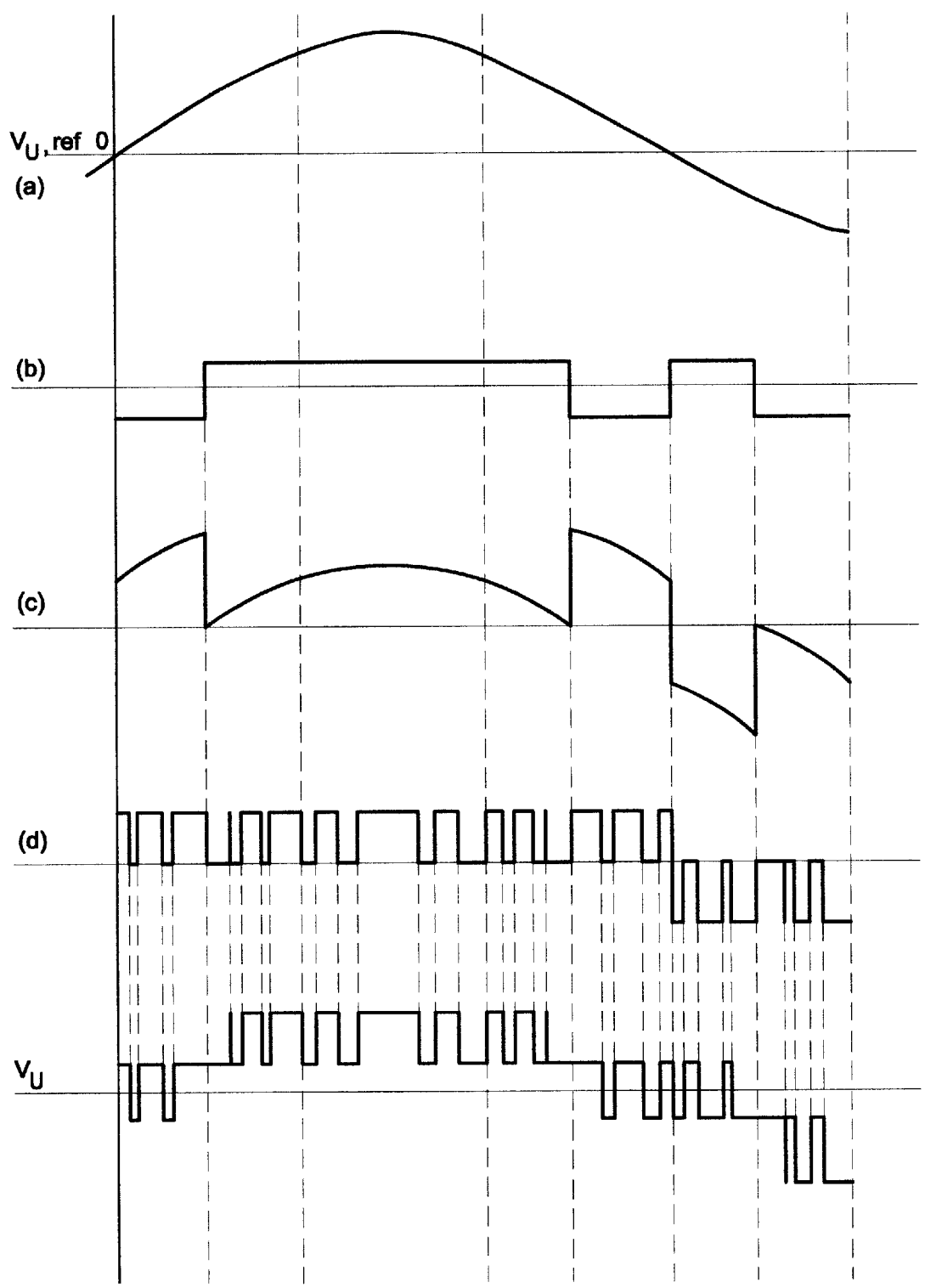
FIG. 4 is a waveform diagram illustrating the operational waveform of the embodiment shown in FIG. 3.

Next, the operating waveform of this embodiment is illustrated in FIG. 4. As illustrated in FIG. 4, the switching operation of the 3-phase inverter is comparatively low, and the single-phase inverters can conduct high frequency switching and the shape of the total waveform is closer to the shape of a sine wave. Here, if the 3-phase inverter operational frequency is lowered, it may even be a square waveform, and a GTO device, which has large capacity, but slow switching, may also be used. In addition, because a high-speed switching device such as an IGBT has low voltage, the single-phase inverters may simply be single-phase inverters in a two-stage series.

Figure 5:
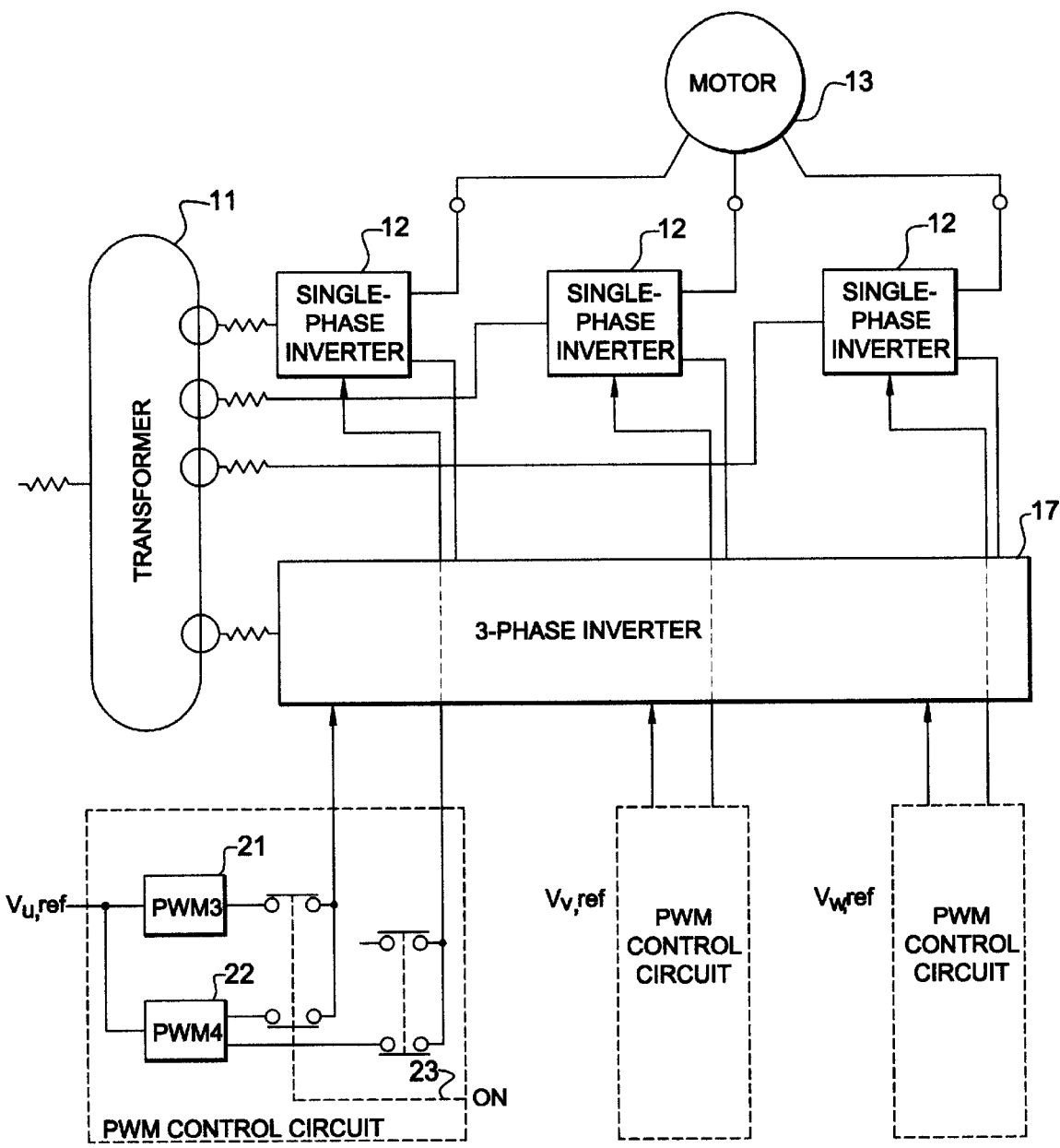
FIG. 5 is a general schematic diagram illustrating one embodiment of the present invention.

Another embodiment of the invention will be explained with reference to FIGS. 5 and 6. The configuration elements illustrated in FIG. 5 that are the same as the configuration elements in FIG. 1 will be given the same numbers, and they will not be explained. Differences from FIG. 1 are a PWM control circuit 21, which generates output voltage just by the 3-phase inverter, a PWM control circuit 22, which outputs voltage by both the 3-phase inverter and the single-phase inverters, and a switch 23, which can switch the PWM control signals based on the output frequency.

Figure 6A:
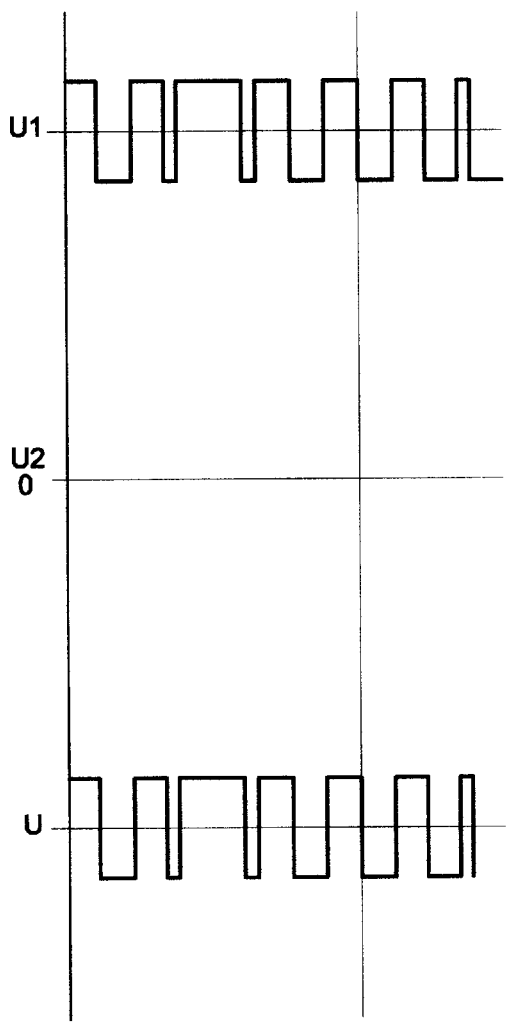
FIG. 6 is a waveform diagram indicating the operational waveform of the embodiment shown in FIG. 5.
Figure 6B:
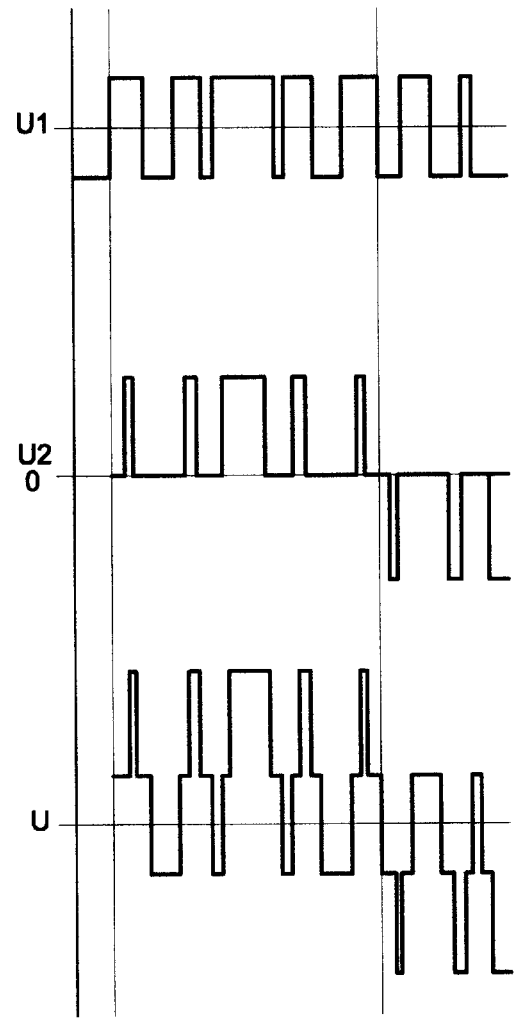

Next, the operation of this embodiment will be explained with reference to FIG. 6. The waveform during low speed is indicated in FIG. 6(a), and the waveform during high speed is indicated in FIG. 6(b). During low speed, either the upper arm or lower arm of the single-phase bridge inverter of the single-phase inverter 12 is on, and is in the bypass state. Consequently, no noticeable low frequency current flows into the smoothing condenser of the single-phase inverter during low speed, and by reducing the ripple current, the life of the condenser is not lowered and the peak current does not flow into the rectifier.

Figure 7:
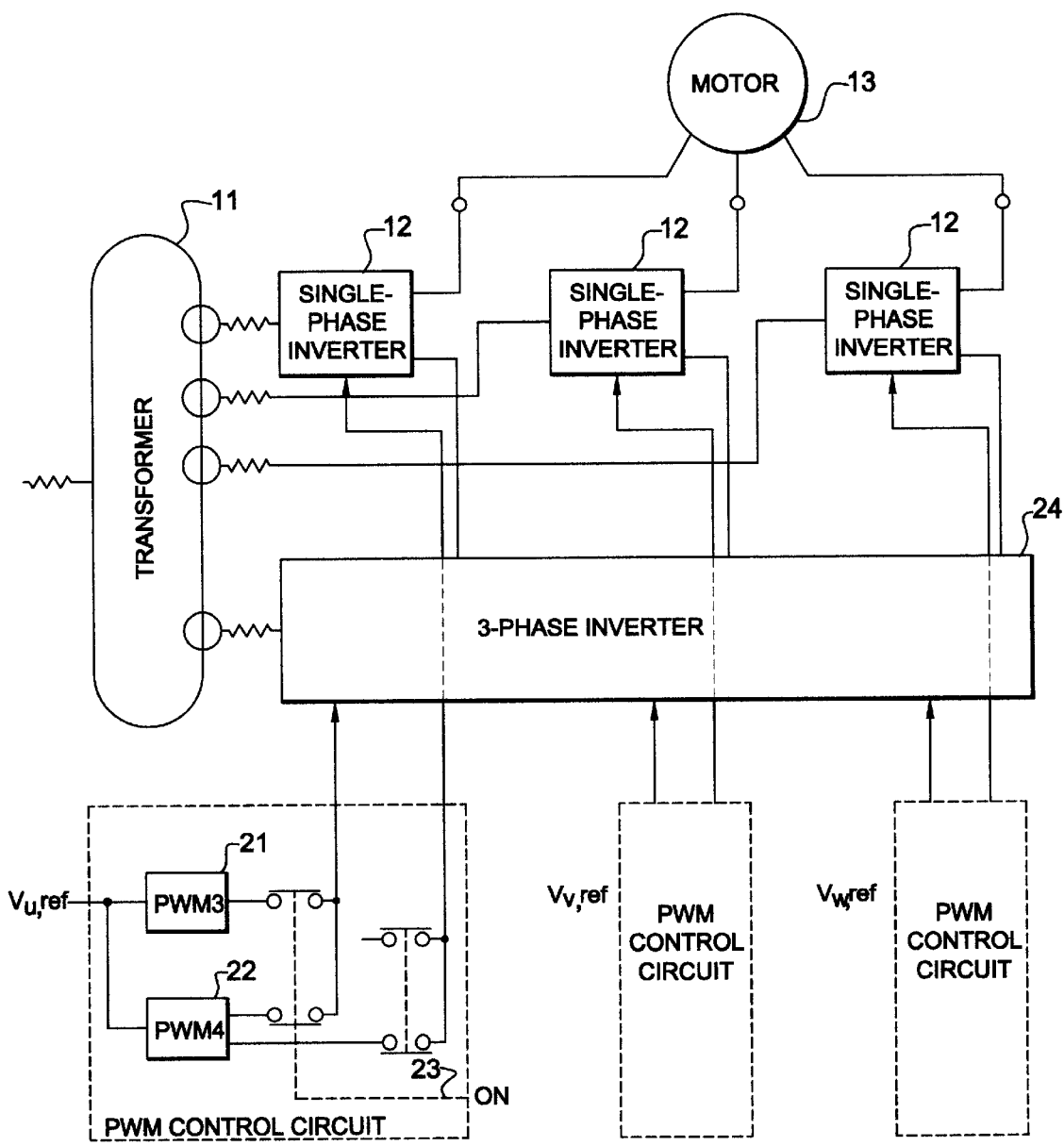
FIG. 7 is a general schematic diagram illustrating one embodiment of the present invention.
Figure 8:
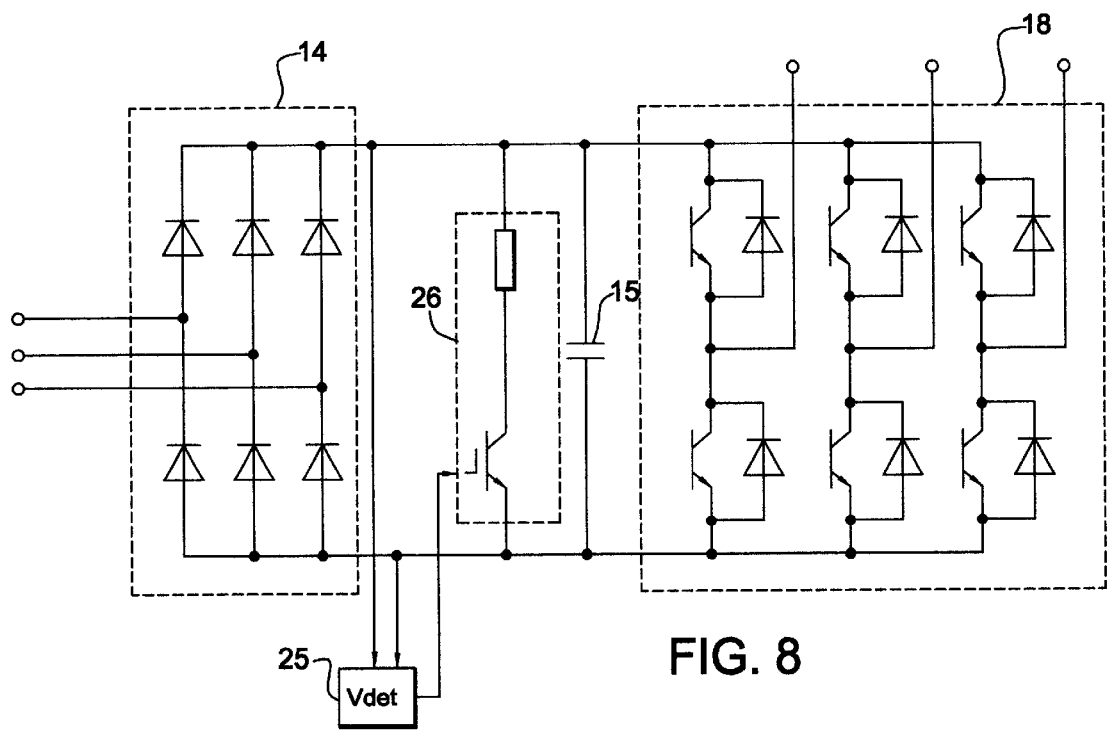
FIG. 8 is a detail schematic diagram illustrating the main circuit configuration of the 3-phase inverter shown in FIG. 7.

Another embodiment will be explained with reference to FIGS. 7 and 8. The configuration elements illustrated in FIG. 7 that are the same as the configuration elements in FIG. 5 will be given the same numbers, and they will not be explained. One difference from FIG. 5 is the addition of a detection circuit 25, which detects the DC voltage of the 3-phase inverter 24, and a discharge circuit 26, which comprises a resistor and a switching element, as illustrated in FIG. 8. When conducting regenerative braking of the motor, the embodiment illustrated in FIG. 1 requires a detection circuit 25 and a discharge circuit 26 in all of the single-phase inverters and in the 3-phase inverter, but in the configuration illustrated in FIG. 7, the detection circuit 25 and the discharge circuit 26 are provided only on the 3-phase inverter.

Next, the operation of this embodiment will be explained. In this embodiment, the motor is driven only by the 3-phase inverter during low speed, and therefore, moves in regenerative mode as is. Meanwhile, during high speed, control is executed to lower the motor voltage. The high frequency becomes high speed from the moment the voltage is lowered to where it can be controlled by the 3-phase inverter, but in the state wherein only the voltage is low, the motor is driven only by the 3-phase inverter, and the power that regenerates from the motor is discharged by the resistor. If done in this manner, 100% of the inverter rating is not attained, but regenerative braking can be conducted by several dozen percent of the rating.

In particular, in stopping the inverter when there is square load torque, and a load with a large $GD^2$ is involved, such as a fan, although the speed reduction is rapid during high speed because there is a load, the inverter stopping time becomes extremely long because there is almost no load at low speed. Consequently, this embodiment is extremely effective because the regeneration capacity increases after becoming low speed.

Figure 16:
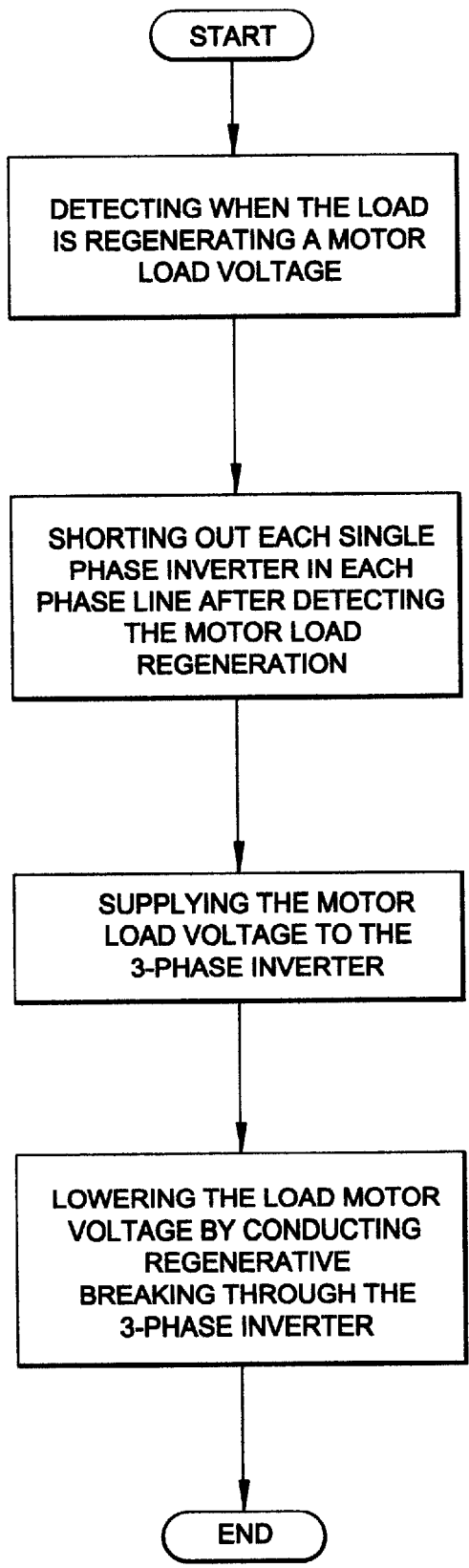
FIG. 16 is a flow chart illustrating one embodiment of the present invention.

According to one embodiment, a method for conducting regenerative braking for a motor load is disclosed wherein the load is driven by a plurality of power cells on each phase-line to the load, the plurality of power inverters comprising at least one single phase power inverter and at least one 3-phase inverter wherein the 3-phase inverter is connected across 3-phase lines. As illustrated in FIG. 16, it is first determined when the motor load is regenerating a motor load voltage. Then, each single phase inverter in each phase line is shorted out after detecting the motor load regeneration. The motor load voltage is then supplied to the 3-phase inverter. Finally, the load motor voltage is lowered by conducting regenerative braking through the 3-phase inverter. The 3-phase inverter changes the motor load voltage into regenerative braking using, for example, a regenerative circuit or a discharge resistance circuit. The regenerative circuit may comprise, for example, GTO's or SCR's. The regenerative circuit may also supply power back to a power grid.

Figure 10:
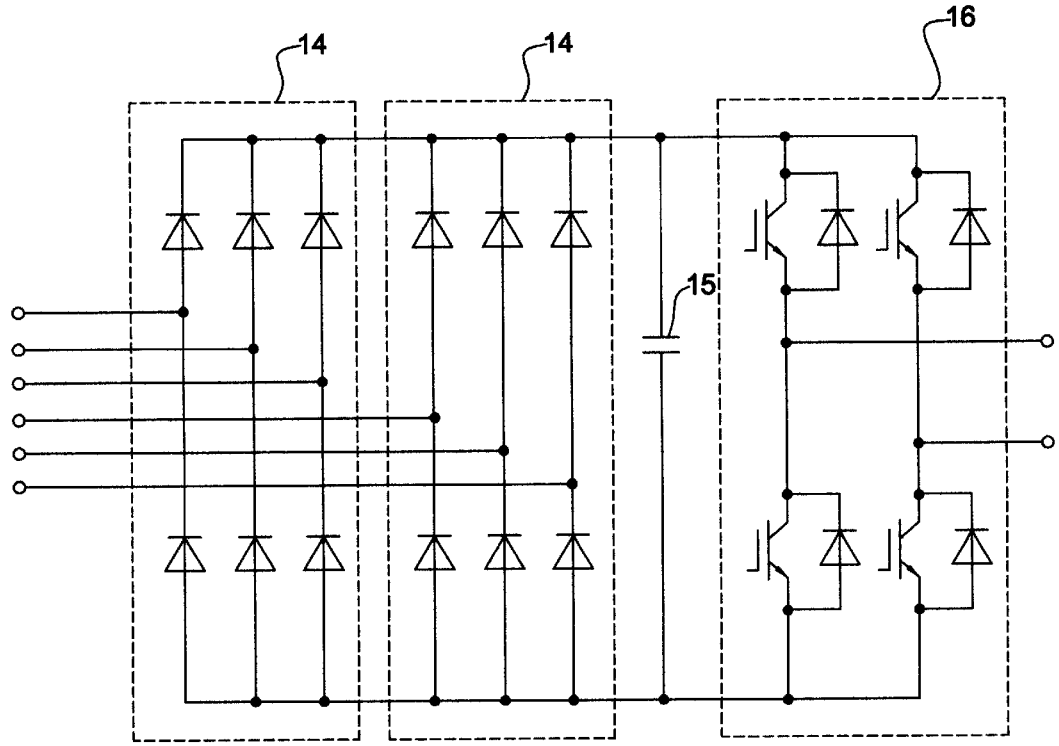
FIG. 10 is a general schematic diagram illustrating the single-phase inverter shown in FIG. 8.
Figure 9:
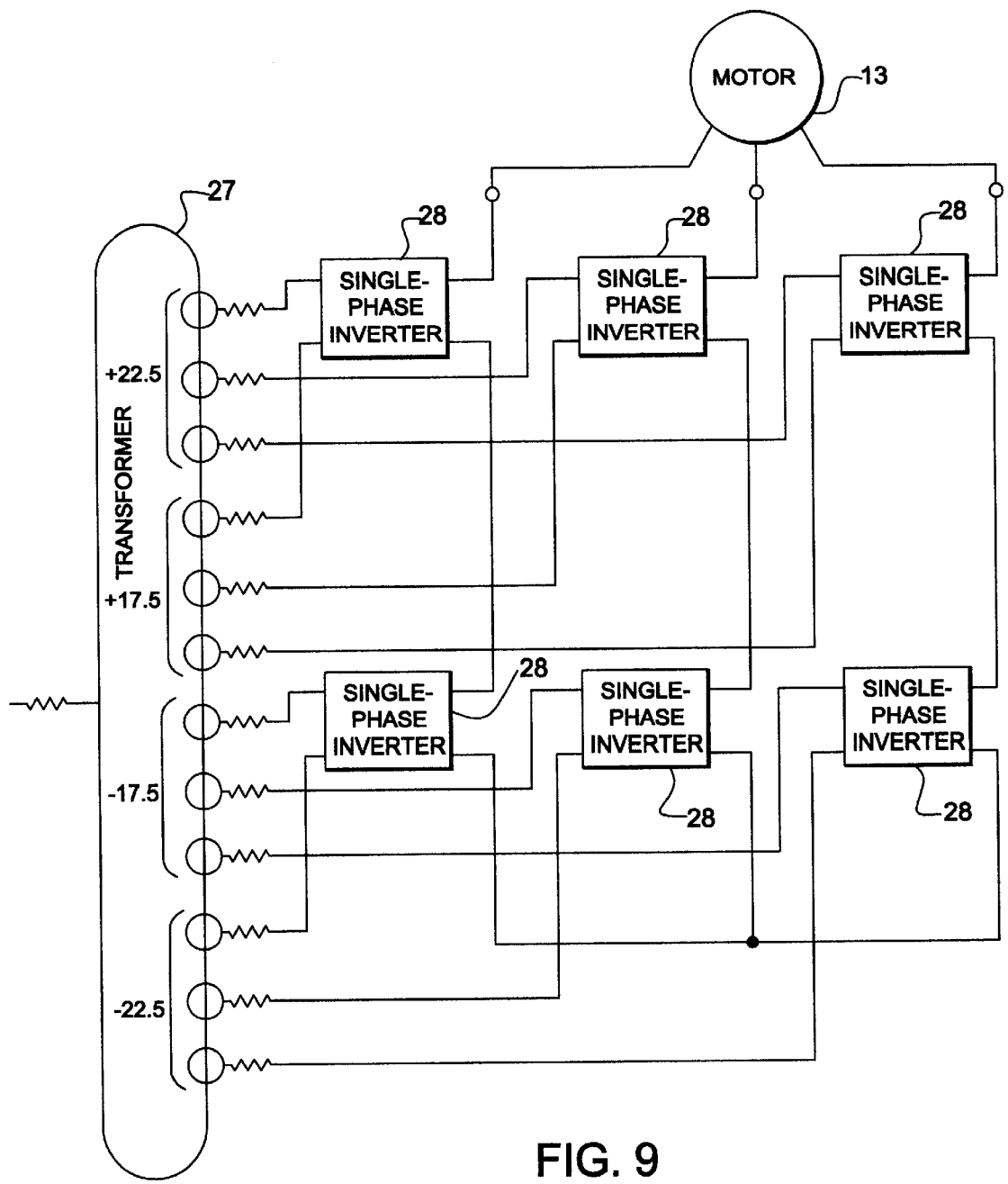
FIG. 9 is a general schematic diagram illustrating one embodiment of the present invention.
Figure 12:
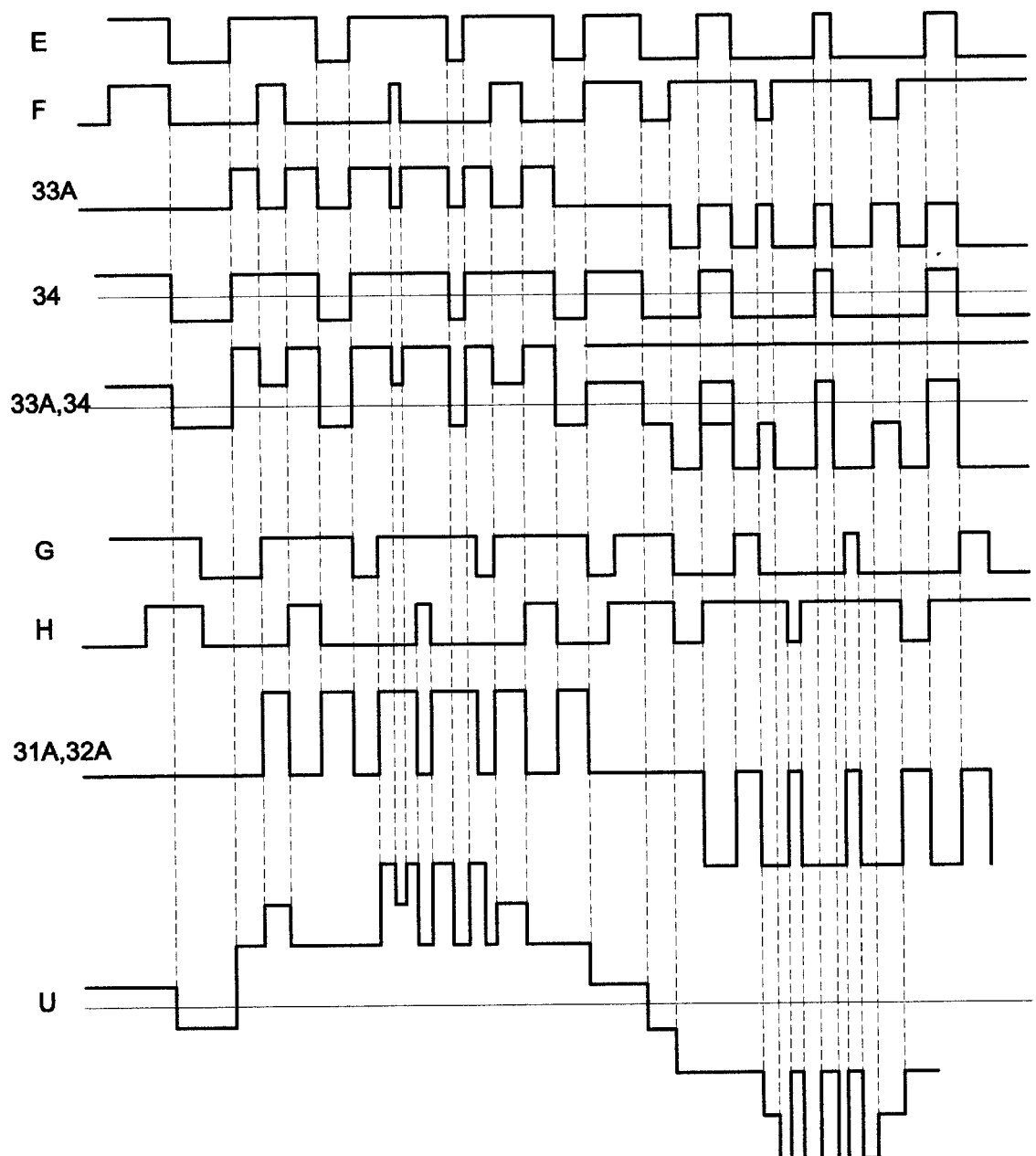
FIG. 12 is a timing chart illustrating the switching operation of the embodiment shown in FIG. 10.

Another embodiment will be explained with reference to FIGS. 9 and 10. The configuration elements illustrated in FIG. 9 that are the same as the configuration elements in FIG. 1 will be given the same numbers, and they will not be explained. One difference from FIG. 1 is that the single-phase inverter input rectifying circuits are divided into groups of 2, and the transformer windings are doubled. In FIG. 9, a transformer 27 is insulated in groups of two to supply 3-phase AC current to the single-phase inverters, and a single-phase inverter 28 has two groups of 3-phase bridge rectifying circuits 14, as indicated in FIG. 10. In the circuit indicated in FIG. 9, compared to the conventional inverter device indicated in FIG. 12, twice the phases are configured at +22.5°, +7.5°, −7.5°, −22.5°, and the secondary windings of the transformer are doubled. This makes the so-called "24 pulse rectifying circuit," and compared to the conventional inverter device that is configured into 12 pulses, as indicated in FIG. 12, the input frequency can be greatly reduced.

Figure 1:
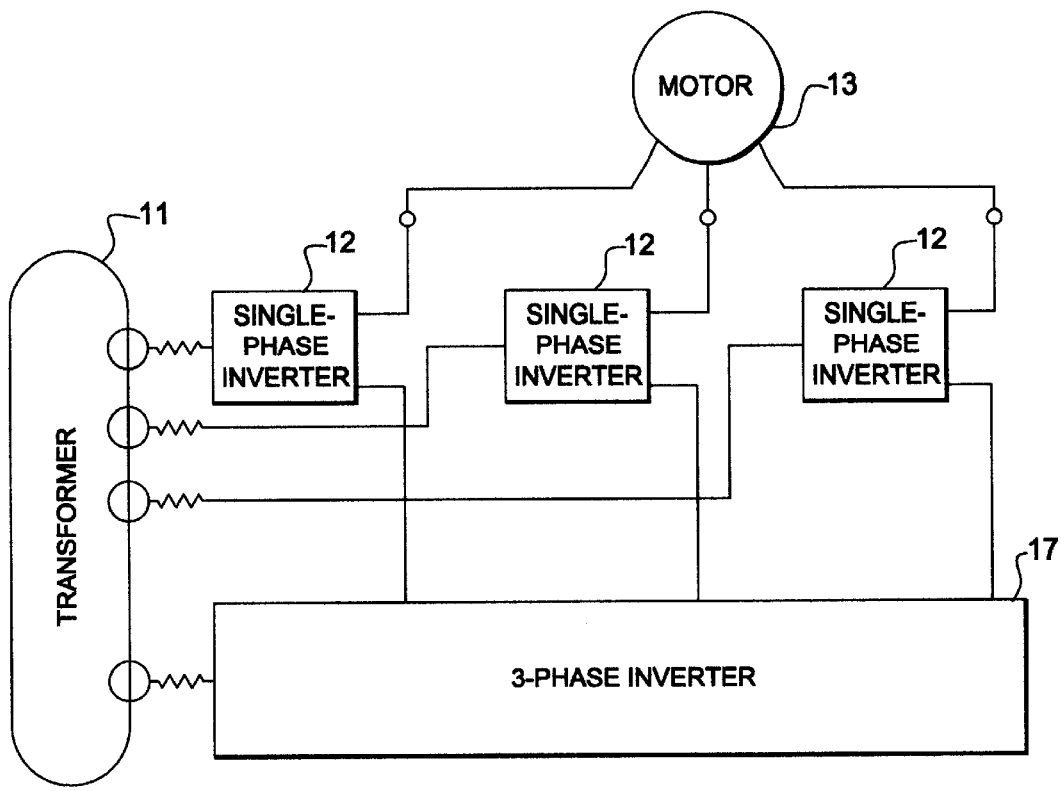
FIG. 1 is a general schematic diagram illustrating one embodiment of the present invention.

Another embodiment involves the first embodiment indicated in FIG. 1, and increases into two groups the rectifying circuits of the 3-phase inverter and single-phase inverters. Compared to the embodiment illustrated in FIGS. 9 and 10, which required increasing the single-phase inverter rectifying circuits to 3 phase parts, the 3-phase inverter rectifying circuit is increased by only one group, and the same effect is obtained as in the embodiment illustrated in FIG. 9. Consequently, the cost-performance is extremely effective.

Figure 11:
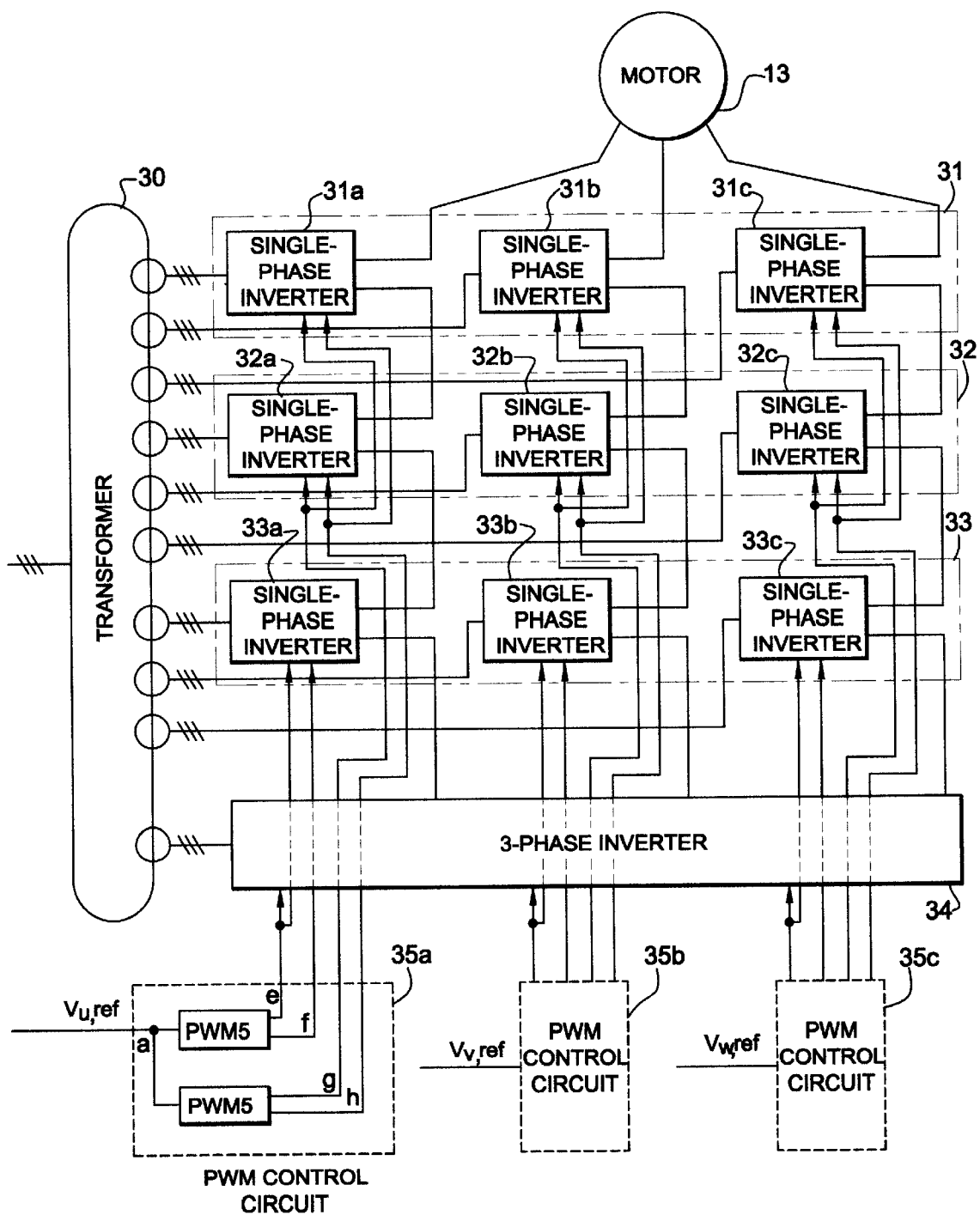
FIG. 11 is a general schematic diagram illustrating one embodiment of the present invention.

Another embodiment will be explained with reference to FIGS. 11 and 12. As illustrated in FIG. 11, this embodiment is configured by a transformer 30, which is connected to a 3-phase AC power source (not indicated in the diagram), single-phase inverter groups 31, 32, 33, and a 3-phase inverter 34, which are connected to the output side of the transformer 30, a filter circuit 35, and control circuits 35$a$, 35$b$, 35$c$, which control single-phase inverter groups 31, 32, single-phase inverter group 33, and 3-phase inverter 34. The motor 13, which is the load of this inverter, is provided on the output side of the single-phase inverter group 31.

When described in further detail, the single-phase inverter group 31 is configured from single-phase inverters 31$a$, 31$b$, 31$c$; the single-phase inverter group 32 is configured from single-phase inverters 32$a$, 32$b$, 32$c$, and the single-phase inverter group 33 is configured from single-phase inverters 33$a$, 33$b$, 33$c$. Also, control circuits 35$a$, 35$b$, 35$c$ are configured from 2 PWM circuits 36$a$,36$b$, respectively.

Next, the control circuits 35$a$ through 35$c$ will be explained with reference to FIG. 12. The PWM circuits 36$a$ and 36$b$ output pulse width signals e, f, g, h corresponding to their respective voltage standards.

Figure 14:
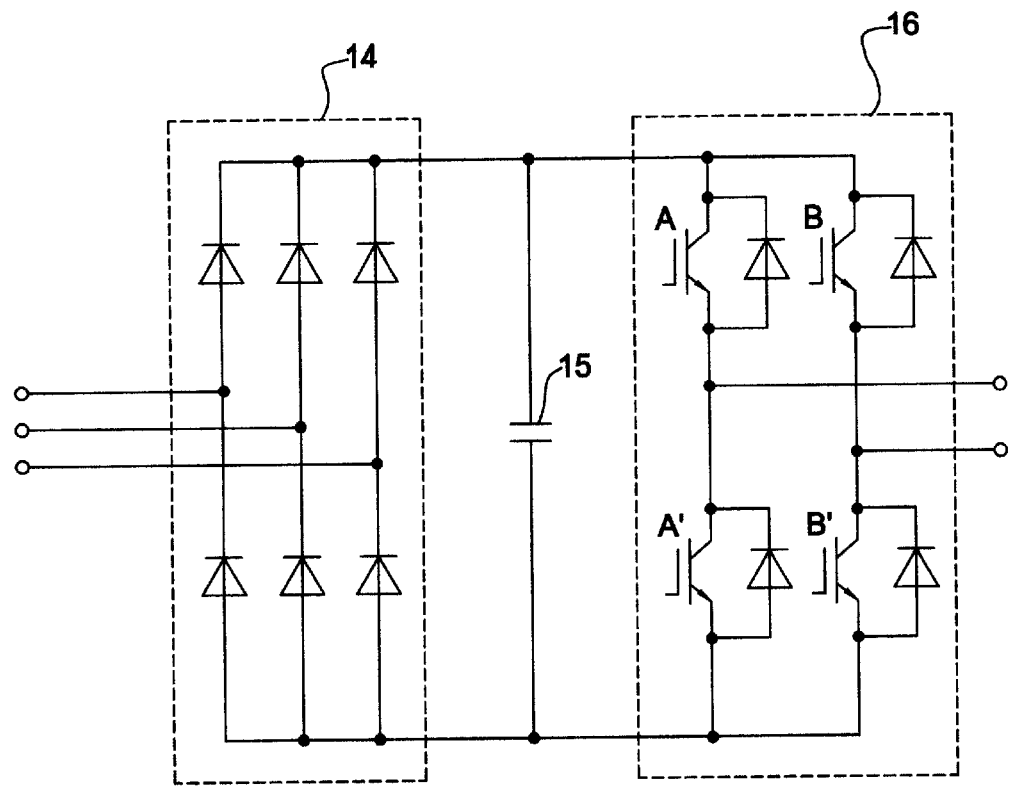
FIG. 14 is a detail schematic diagram illustrating a single-phase inverter of a voltage-type multi-inverter device shown in FIG. 12.
Figure 15:
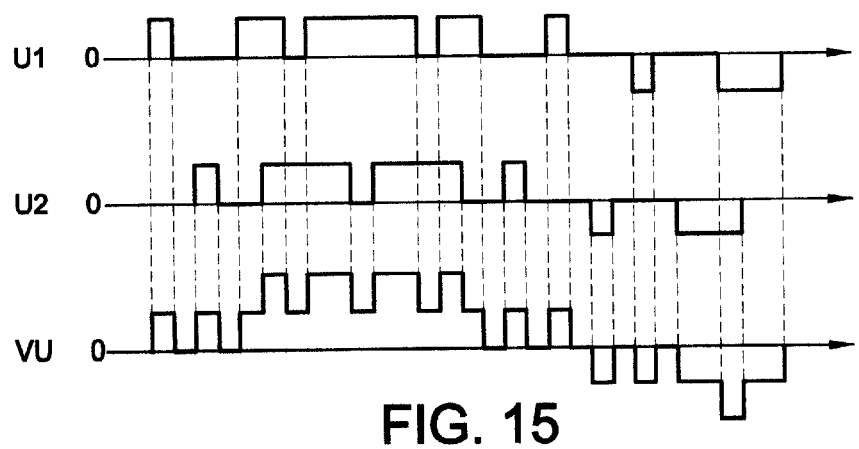
FIG. 15 is a waveform chart illustrating the output waveform of a single-phase inverter of voltage-type multi-inverter device shown in FIG. 12.

When signal e is at the H level element A (refer to FIG. 14) within the single-phase inverter 33$a$ is turned on, and element A' (refer to FIG. 14) is turned off. Conversely, when signal e is at the L level, element A is turned off and element A' is turned on. Elements U, U$^1$ within 3-phase inverter 34 are controlled in the same way by signal e.

In addition, in the same way as with signal e, signal f controls elements, B, B$^1$ of the single-phase inverter 33$a$ (refer to FIG. 14); signal g controls elements A, A$^1$ of the single-phase inverters within 31$a$ and 32$a$; and signal h controls elements B, B$^1$ of the single-phase inverters 31$a$ and 32$a$.

By exercising control in this way, the U phase output voltage waveform illustrated in FIG. 12 can be obtained.

Consequently, in this embodiment, the switch signal may be supplied from only one PWM circuit in relation to the inverter that supplies the same switching timing. As a result, the configuration of the control circuit can be simplified and the number of parts is reduced.

In order to achieve the above purposes, one embodiment configures single-phase inverters with a 3-phase inverter in a serial connection. Consequently, because a configuration that combines single-phase inverters with a 3-phase inverter has fewer parts than one configured with single-phase inverters alone, and because the 3-phase output at the DC part is balanced, there is less restriction on the smoothing condensers and rectifier circuit, and the reliability and economy are improved.

In addition, because the single-phase inverters are supplied with the difference by which the waveform output by the 3-phase inverter is shifted from a sine wave, and because the single-phase inverters can be connected in multiple series, a low voltage high speed switching device can be used. In addition, because the single-phase inverters supply the difference by which the waveform output of the 3-phase inverter is shifted from a sine wave, a sine wave output waveform can be obtained by combining them together.

Further by having PWM control of only the aforementioned 3-phase inverter during low a speed, and bypassing the remaining single-phase inverters, the system can avoid the double power pulse of the output frequency during low frequency output, which is a problem with single-phase inverters, and this reduces restrictions on the parts used, and improves reliability.

By lowering the motor voltage during regeneration, executing regeneration or resistance discharge only with the 3-phase inverter, and bypassing the remaining single-phase inverters, the system can conduct regenerative braking by adding only one regeneration circuit or discharge resistance circuit.

In addition, by making multiple rectifying circuits of the individual single-phase inverters, the system can reduce the required input frequency without reducing the number of single-phase inverter stages.

Further, by making multiple rectifying circuits of the individual single-phase inverters and 3 -phase inverter, the system can reduce the required input frequency, without reducing the number of single-phase inverter and 3-phase inverter stages.

By overlapping the switching timing of the 3-phase with a specific single-phase inverter and by overlapping the switching timing of the remaining single-phase inverters, the system may provide a control means on every inverter which is controlled by the same switching time, and this is linked to the reduction in the number of parts and to the increase in reliability.

It will be understood that the foregoing merely illustrates the principles of the present invention. Those skilled in the art will be able to devise numerous alternative arrangements which, although not explicitly shown or described herein, embody those principles and are thus within the spirit ans scope of the invention as defined in the appended claims.

We claim:

1. A method for conducting regenerative braking for a motor load, comprising the steps of:

driving said load using a plurality of power inverters on each phase-line to the load, said plurality of power inverters comprising at least one single phase power inverter and at least one 3-phase inverter wherein the 3-phase inverter is connected across 3-phase lines;

detecting when said motor load is regenerating a motor load voltage;

shorting out each single phase inverter in each phase line after detecting the motor load regeneration;

supplying said motor load voltage to said 3-phase inverter; and lowering said load motor voltage by conducting regenerative braking through the 3-phase inverter.

2. The method according to claim 1, wherein the 3-phase inverter changes said motor load voltage into regenerative braking using a regenerative circuit.

3. The method according to claim 2, wherein said regenerative circuit comprises GTO's.

4. The method according to claim 2, wherein said regenerative circuit comprises SCR's.

5. The method according to claim 1, wherein the 3-phase inverter changes the motor load voltage into regenerative braking using a discharge resistance circuit.

6. The method according to claim 2, wherein the regenerative circuit provides power back to a power grid.

7. A power drive system for driving a motor load which provides regenerative braking for the motor load, comprising:

a plurality of power inverters on each phase line of the motor load, said plurality including at least one single phase inverter and at least one 3-phase inverter wherein the 3-phase inverter is connected across the different phase lines to the motor load, wherein said at least one single phase inverter and at least one 3-phase inverter output voltage for driving the motor load means for detecting when said motor load is regenerating a motor load voltage means for shorting out each single phase inverter in each phase line after detecting the motor load regeneration;

means for supplying said load voltage to the 3-phase inverter; and means for lowering said motor load voltage by conducting regenerative braking through the 3-phase inverter.

8. The power drive system according to claim 7, wherein the 3-phase inverter changes said motor load voltage into regenerative braking using a regenerative circuit.

9. The power drive system according to claim 8, wherein said regenerative circuit comprises GTO's.

10. The power drive system according to claim 8, wherein said regenerative circuit comprises SCR's.

11. The power drive system according to claim 7, wherein the 3-phase inverter changes the motor load voltage into regenerative braking using a discharge resistance circuit.

12. The power drive system according to claim 8, wherein the regenerative circuit provides power back to a power grid.

* * * * *